United States Patent Office 2,921,688
Patented Jan. 19, 1960

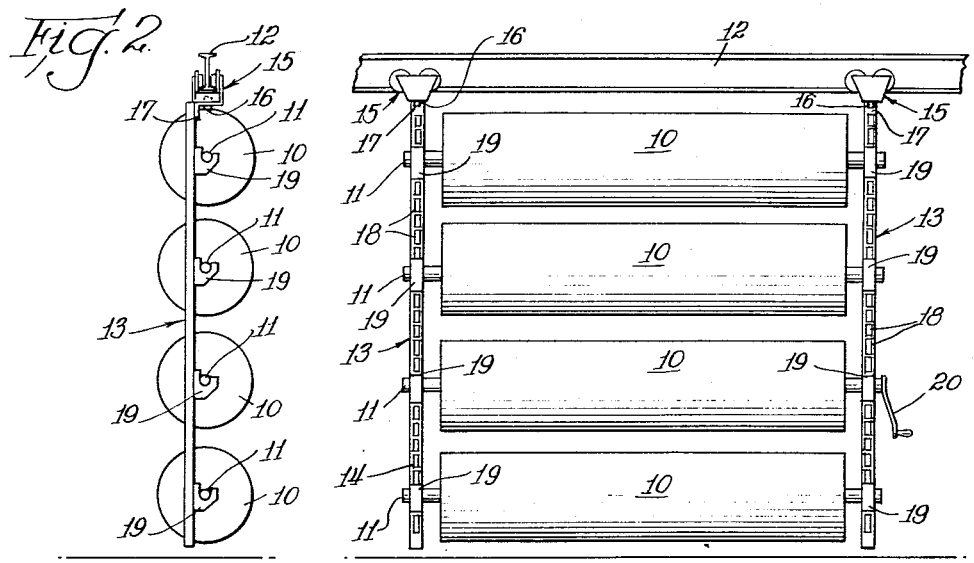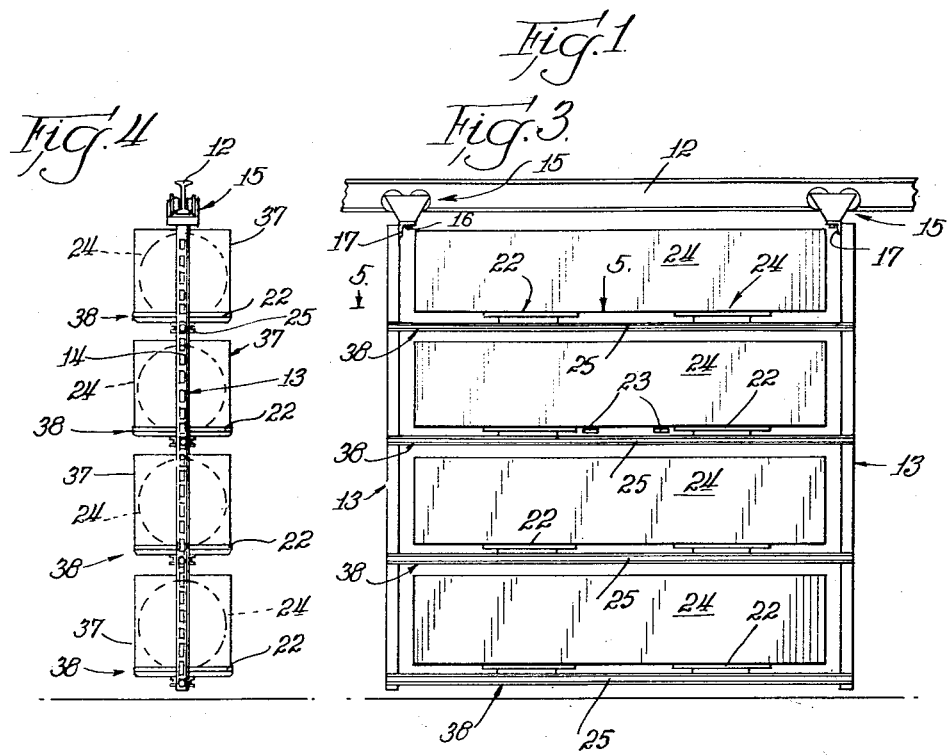

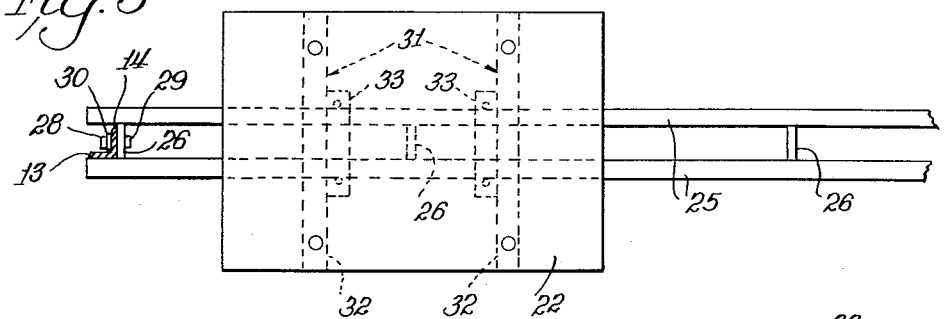
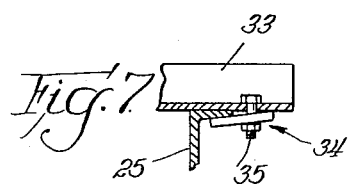
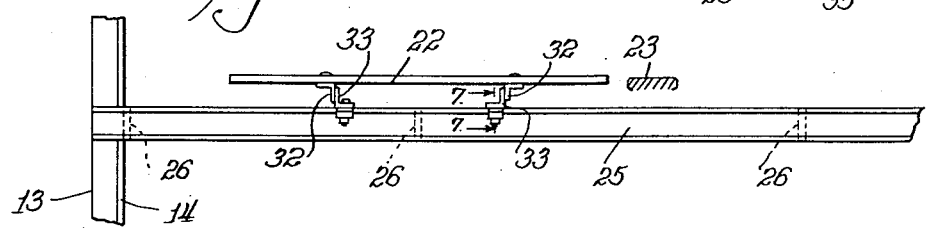
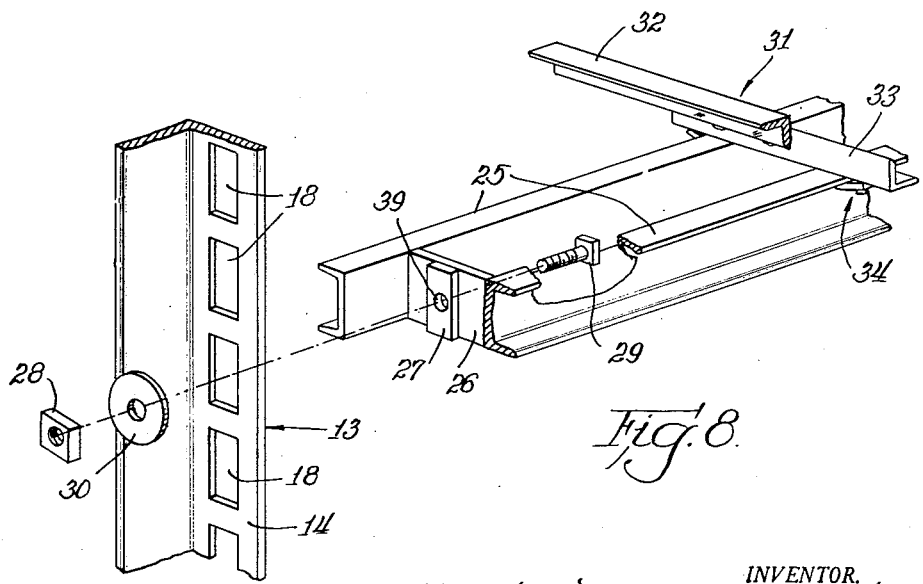

2,921,688

RACK FOR OPTIONALLY SUPPORTING ARTICLES ROTATABLY OR STATIONARILY

Claud C. Riemenschneider, Western Springs, Ill.

Application May 13, 1955, Serial No. 508,071

4 Claims. (Cl. 211—2)

My invention relates to racks of the type adapted to support articles individually in series, one above the other, for example, rolls of carpeting or the like, and has reference more particularly to a rack wherein such articles may be thus supported optionally on spindles or on pallets.

A rack of the type to which the present invention relates is shown in my Patent No. 2,601,560 granted June 24, 1952, wherein a series of spindles which are adapted to support rolls of carpeting thereon are mounted in vertically spaced series and are individually adjustable vertically on a pair of hangers which are supported on an overhead track so that the rack and its load may be moved from place to place.

In my aforesaid patent it is contemplated that the rolls of carpeting be mounted on the spindles so that the carpeting may be wound on or unwound from the spindle as required for displaying the carpeting and cutting off lengths therefrom, and for this purpose the spindle may be provided, as shown in said patent, with clamps for attaching the leading edge of the carpeting thereto for winding the carpeting on the spindle or, if the spindle is removable from the rack, it may be inserted endwise through the central opening of the carpet roll and locked on the spindle to rotate therewith, as shown, for example, in my copending applications Serial Nos. 475,186 and 475,204, both filed December 14, 1954 now U.S. Patent 2,838,249, dated June 10, 1958, and U.S. Patent 2,904,278, dated Sept. 15, 1959.

Carpet rolls come from the mills in individual crates or boxes or wrapped in burlap and it is oftentimes desirable to store the rolls in the original crates, boxes, or burlap wrappings in the same storage racks which are used for storage of carpet rolls on spindles, and accordingly it is quite advantageous and important that the racks be adapted to support the rolls of carpeting optionally on the spindles on which the carpeting may be wound and unwound or on shelves or pallets upon which the rolls may be laid in their original crates, boxes or wrappings.

Such adaptability is desirable for economy of equipment and space inasmuch as separate complete racks for rotatably supporting the rolls and other separate complete racks with shelves or pallets for supporting the boxed or wrapped rolls would greatly increase the cost of storage equipment and require considerable extra space, and the adaptability should be applicable to any racks with which the storage space is provided, whether the racks are suspended or floor supported, although it is especially advantageous in track supported installations, such as that of my above mentioned patent, inasmuch as the hangers thereof are rather permanently mounted and other complete racks may not be readily substituted at places in the system where it may be desired to store the carpet rolls in the original packages.

Moreover, adaptability of individual carpet mountings of the racks for either spindle or shelf support of the rolls is desirable as it may be advantageous in some cases to support, on the same rack, rolls which may be wound and unwound and also rolls in the original packages.

The principal objects of my invention are, to provide racks which are readily adaptable to support thereon rolls in a rotatable manner for winding and unwinding or to support packaged rolls in their original containers; to permit the conversion of the racks from the one form of roll support to the other to be conveniently and quickly accomplished; and to provide simple and inexpensive facilities for such conversion which do not require special or intricate parts and are made up of standard materials which are readily available, these and other objects being accomplished as pointed out more particularly hereinafter and as shown in the accompanying drawing, in which:

Fig. 1 is a typical front view of a rack structure for storing rolls of material on spindles and includes a fragmentary portion of the beam from which the hangers are suspended;

Fig. 2 is an end view of the structure of Fig. 1;

Fig. 3 is a front view illustrating a converted arrangement of the rack structure of Figs. 1 and 2 that is adapted for supporting boxed or wrapped rolls of material on storing pallets;

Fig. 4 is an end view of the converted structure of Fig. 3;

Fig. 5 is an enlarged partial horizontal sectional view taken on the line 5—5 of Fig. 3;

Fig. 6 is a partial front elevational view of the portion of the structure shown in Fig. 5;

Fig. 7 is a fragmentary vertical sectional view taken on the line 7—7 of Fig. 6; and Fig. 8 is an exploded perspective view with parts broken away illustrating the construction of the cross member and pallet supporting members and illustrating the arrangement for fixedly securing the cross member to one of the hangers.

Referring to the drawings and particularly to Figs. 1 and 2 thereof, there is illustrated a rack structure which is adapted to store rolls of material 10 thereon in superposed relation on rotatable spindles 11 and which, in accordance with my invention, may be converted by substitution of shelves or pallets for use in storing, in similar superposed relation, such rolls or other articles in non-rotatable manner, as for example in boxes, crates or wrappings in which they are packaged, the converted structure being shown in Figs. 3 and 4.

This rack structure of Figs. 1 and 2, which is similar to that of my aforesaid patent, comprises a track 12 from which a pair of hangers or uprights 13, and usually a number of pairs thereof, are suspended for supporting a plurality of rotatable spindles 11 between each pair. The track 12 may be a standard I-beam of a size suitable for the contemplated loads and is supported in an overhead position in any desired manner which will leave the space thereunder free for storage and movement of the racks along the track and will also permit free access to the racks at any place where access is required.

Each hanger 13 is an angle iron and each is individually supported in upright position by a trolley 15 at the upper end for individual movement along the track. Each angle iron 13 has a bracket 17 formed as a part thereof or secured thereto at the upper end having a horizontal flange, as shown in Fig. 2, which bears sidewise against the horizontal bottom face of the frame of the trolley 15 and is secured thereto by a central pin or bolt 16 which holds the horizontal flange of the bracket flatwise against the bottom horizontal face of the trolley frame and permits turning of the hanger 13 about the vertical axis of the pin or bolt 16.

One flange of each of the angle iron hangers 13 is provided with a vertical series of spaced openings 18, this apertured flange being indicated at 14, and in the arrangement of Figs. 1 and 2 the two angle irons of the pair are oriented so that the apertured flanges 14 thereof are coplanar facing sidewise from the vertical plane of the track 12 and the other flanges thereof are in opposed parallel relationship facing lengthwise of the track. A series of pairs of spindle supporting brackets 19 are detachably engaged in corresponding selected openings 18 of each of the hangers 13 so that the brackets of each pair are at the same level, and each pair of said brackets 19 is adapted to rotatably support a spindle 11 upon which the carpeting is wound and supported thereon in the roll 10 form, and it is to be noted that the pivot 16 of the hanger supporting bracket 17 is offset from the vertical axis of the hanger 13 the same distance as the bearing centers of the brackets 19 so that the center of the load on the spindles is in a vertical plane of the pivot 16.

In the illustrative rack the hangers 13 are maintained in the appropriate spaced apart relation solely by the spindles 11 and the engagement thereof in the brackets 19 and thus the rack may be arranged with the hangers 13 spaced apart at any selected distance to accommodate and correspond to rolls 10 of various lengths by merely utilizing spindles 11 of appropriate lengths.

Since the brackets 19 are readily removable, their location on the angle iron hangers 13 may be adjusted to provide appropriate vertical spacing in accordance with the diameters of the rolls to be mounted on the rack.

A crank 20 is shown engaged on the end of one of the spindles 11 and is preferably detachable for application to other spindles. This crank provides a convenient means for rotating the spindles to wind and unwind the carpeting thereon.

In accordance with the present invention, other different supports of shelf or pallet type are provided which may be readily substituted on the hangers 13 for the brackets 19 and spindles 11 to accommodate thereon rolls 10 which are boxed or packaged, as indicated at 37 in Fig. 4, or any other articles which require shelf or pallet support, thus permitting the rack or any racks of the storage installation to be converted quickly to accommodate thereon rolls on rotatable spindles or boxed or packaged rolls or other articles on shelves or pallets.

The structure parts which are common to both the spindle form of the rack of Figs. 1 and 2 and to the converted shelf or pallet form of Figs. 3 and 4 are numbered identically and are not described in detail in connection with both forms. The only structural parts of the Figs. 1 and 2 rack incapable of use in the converted structure are the spindles 11 and the spindle supporting brackets 19 which, as previously indicated, are readily detachable.

For converting the rack of Figs. 1 and 2 to the shelf or pallet form of Figs. 3 and 4, shelves or pallets, each indicated as a whole at 38, are provided which are secured midway of the width thereof at their opposite ends to the hangers 13 so that the shelves or pallets are nontippable, and for the attachment of said shelves or pallets 38 thereto, the angle iron hangers 13 are turned on their respective supporting pins or bolts 16 so that the apertured flanges 14 thereof, instead of facing sidewise from the vertical plane of the track 12 as in Fig. 1, are in planes normal to the length of the track 12, each facing toward the opposite hanger 13 with which it is paired.

Each so-called shelf or pallet 38 is shown herein as an assembly of a frame which is attachable to the hangers and has one or more platforms or pallet plates 22 mounted thereon at an elevation thereabove for reasons hereinafter explained, and the frame is composed of a pair of stringers 25 which extend lengthwise of the shelf or pallet 38 and are spaced apart a distance corresponding to the width of the hangers 13 to accommodate the latter therebetween.

The stringers 25 are preferably lengths of channel iron, as shown in the enlarged and detailed illustrations of the pallets 38 in Figs. 5, 6, 7 and 8, with the closed sides thereof facing inwardly toward one another and these stringers 25 are secured together in the spaced apart relation by a plurality of intervening spacer plates 26 which are welded or otherwise secured at their opposite extremities to the stringers 25.

Two of the said plates 26 are located near the opposite ends respectively of the stringers 25 sufficiently distant from the stringer extremities to provide seats between the spaced apart end portions of the stringers to receive the hangers 13 therein, as shown in Figs. 5 and 6, and each of these end ones of the plates 26 has secured on the outer face thereof a lug 27 of the same shape as and adapted to be received and fit in any of the openings 18 of the hangers 13.

Each lug 27 has a bolt hole 39 extending centrally therethrough, and through the plate 26 to which it is attached, for fastening the shelf or pallet 38 to the hangers 13 and in the fastened position the lugs 27 of the two end plates 26 are engaged respectively in selected corresponding openings 18 of the two hangers, and each end plate and lug has a bolt 29 passed through the aforesaid bolt hole 39 thereof and through a large washer 30 at the outer side of the hanger flange and secured in place by a nut 28 threaded on the bolt, the washer 30 being large enough to straddle the opening 18 and thus extend across the lug 27 and sufficiently therebeyond to bear against the outer face of the flange of the hanger and lock the lug 27 in the opening 18.

Because the hangers 13 were turned on the pivot 16 a quarter turn as aforesaid for attachment of the shelves or pallets 38 thereto and the stringers 25 are central of the pallet width, the pallets 38 extend equally at opposite sides of the vertical plane of the pivots 16 of the two hangers 13 so that loads on the pallets 38 are substantially centered with respect to said vertical plane.

A fork lift is commonly employed for handling rolls of carpeting and in order to permit such handling of the carpet rolls in the storing thereof, in boxes, crates, burlap coverings or otherwise, on the shelves or pallets 38 and the removal thereof from the shelves or pallets, two platforms or pallet plates 22 are preferably employed on each shelf or pallet 38 and spaced apart sufficiently to accommodate the fork 23 of the fork lift therebetween under a central portion of the carpet roll or box 37, as indicated at 23 in Fig. 3, and said platforms or pallet plates 22 are mounted on the stringers 25 at a sufficient elevation thereabove to accommodate the fork 23 of the fork lift between the stringers 25 and the carpet roll or box 37, also as shown in Fig. 3, so that the fork of the fork lift can engage under an exposed middle portion of the roll or box to load the roll or box 37 on and remove it from the shelf or pallet 38.

Moreover, the platforms or pallet plates 22 are preferably fastened on the stringers 25 by clamping in a manner to permit adjustment thereof along the stringers.

For holding the platforms or pallet plates 22 in the elevated position above the stringers 25, each has secured thereto on the underside, a pair of laterally spaced rails or cleats, each indicated as a whole by the reference numeral 31, which extend crosswise of and are clamped on top of the stringers 25. These rails or cleats may be conveniently made of two angle irons, an upper long one 32 and a lower short one 33, disposed in inverted relation to one another with a marginal portion of one flange of each overlapping the other, as shown in Figs. 6 and 8, and secured to one another, as for example by welding or brazing, and each rail having a flange of the lower angle iron 33 provided on the underside with two turnbuckle clamping plates 34 which are properly placed and attached thereto by bolts 35 to extend under and be clamped by the bolts to the top flanges of the stringers 25 as shown in Fig. 7.

Thus the platforms or pallet plates 22 are readily attachable to and removable from the stringers 25 and may be slid along the stringers and clamped thereto at any desired locations.

It will be noted from the above that when the shelves or pallets 38 are employed, the hangers 13 are turned on their supporting pivots 16 so that the hangers are located in the vertical plane of the pivots 16 of the pair of hangers and accordingly in the vertical plane of suspension of the hangers 13 so that the loads on the shelves or pallets 38 are substantially centered with respect to said plane of suspension and do not impose a tilting effect on the hangers.

On the other hand, when the spindles 11 are employed, the hangers 13 are turned on their supporting pivots 16 so that they are located at one side of the said plane of suspension of the hangers, as shown in Fig. 2, and the brackets 19 support the spindles 11 so that the latter are centered with respect to said plane of suspension, namely, the vertical plane of the pivots 16, and thus the loads on the spindles 11 do not impose any tilting effect on the hangers.

While I have shown and described my invention in a preferred form, I am aware that various changes and modifications may be made therein without departing from the principles of the invention, the scope of which is to be determined by the appended claims.

What is claimed is:

1. Storage facilities of the class described for supporting a plurality of separate loads individually thereon in vertical series, said facilities comprising individual load supports and a pair of laterally spaced uprights which are correspondingly provided at one side of each with mounting means at vertical intervals lengthwise thereof by which said load supports are detachably securable thereto each at a plurality of optional elevations variably distant from one another, each upright being independently supported at its upper end eccentrically to turn in an arcuate path about a respective vertical axis and said uprights being thereby swingable to first and second selectable quarter turn positions in the first one of which quarter turn positions both uprights are centered in a vertical plane common to said vertical axis of both uprights with the mounting means sides of the uprights facing toward one another and in the second one of which said quarter turn positions both uprights are at one side of and have their mounting means sides facing toward and spaced laterally from said vertical plane, said load supports being elongated platform type supports provided substantially midway of the width thereof at each end with mounting means companionable to and detachably engageable with said mounting means of the uprights in said first selectable quarter turn position thereof to mount and hold said platform type supports stationarily on the uprights, said uprights being adapted in said second selectable quarter turn position thereof to mount and support conjointly thereon rotatable spindle type load supports on said uprights substantially centered in said plane.

2. Storage facilities as defined in claim 1 wherein the uprights are suspended from an overhead track for independent movability therealong and such independent movability is restrained and conjoint movability thereof established by securing a plurality of said load supports thereon in either of said selectable quarter turn positions of the hangers.

3. Storage facilities as defined in claim 1 wherein the uprights are angle irons each having at least one flange at right angles to another flange and the mounting means thereof at vertical intervals are provided by vertically spaced openings of one of the flanges.

4. Storage facilities as defined in claim 1 wherein the elongated platform type load supports are each provided with a pair of corresponding elongated straight rigid members by which the uprights are connected to one another and said members are secured together in laterally spaced parallel relation and said members have end portions thereof spaced apart to receive the uprights therebetween and the uprights are detachably secured to the members at places remote from and between the ends of said members.

References Cited in the file of this patent

UNITED STATES PATENTS

| | | |
|---|---|---|
| 818,595 | Wilcox | Apr. 24, 1906 |
| 1,462,434 | Wendel | July 17, 1923 |
| 1,915,727 | Friedemann | June 27, 1933 |
| 2,601,560 | Riemenschneider | June 24, 1952 |
| 2,691,203 | Wilder | Oct. 12, 1954 |